US009827837B2

(12) United States Patent
Barber et al.

(10) Patent No.: US 9,827,837 B2
(45) Date of Patent: Nov. 28, 2017

(54) MOVEABLE PANEL SYSTEM FOR NON-PARALLEL TRACKS

(71) Applicant: Tesla Motors, Inc., Palo Alto, CA (US)

(72) Inventors: Howard Barber, Pleasanton, CA (US); Steve Klotz, Fremont, CA (US); Paul Connolly, San Francisco, CA (US)

(73) Assignee: TESLA, INC., Palo Alto, CA (US)

( * ) Notice: Subject to any disclaimer, the term of this patent is extended or adjusted under 35 U.S.C. 154(b) by 0 days.

(21) Appl. No.: 15/087,454

(22) Filed: Mar. 31, 2016

(65) Prior Publication Data

US 2017/0282697 A1 Oct. 5, 2017

(51) Int. Cl.
B60J 7/057 (2006.01)
B60J 7/043 (2006.01)

(52) U.S. Cl.
CPC ............ B60J 7/057 (2013.01); B60J 7/043 (2013.01)

(58) Field of Classification Search
CPC ................................ B60J 7/057; B60J 7/043
USPC ............................. 296/216.01–224
See application file for complete search history.

(56) References Cited

U.S. PATENT DOCUMENTS

| 4,114,945 | A | * | 9/1978 | Lutz | B60J 7/02 16/93 R |
|---|---|---|---|---|---|
| 5,335,961 | A | | 8/1994 | Reinsch | |
| 5,707,102 | A | * | 1/1998 | Takahashi | B60J 10/82 296/221 |
| 5,899,524 | A | | 5/1999 | Mori | |
| 7,182,400 | B2 | * | 2/2007 | Grimm | B60J 7/043 296/216.08 |
| 8,444,217 | B2 | * | 5/2013 | Nellen | B60J 7/02 296/216.03 |
| 8,672,398 | B2 | | 3/2014 | Gruss | |
| 8,708,404 | B2 | | 4/2014 | Gruss | |
| 8,807,642 | B2 | | 8/2014 | Gruss | |
| 8,807,643 | B2 | | 8/2014 | Gruss | |
| 8,807,644 | B2 | | 8/2014 | Gruss | |
| 2004/0160082 | A1 | * | 8/2004 | Bohm | B60J 7/0023 296/97.11 |
| 2005/0001457 | A1 | * | 1/2005 | Bohm | B60J 7/04 296/216.04 |
| 2008/0258511 | A1 | * | 10/2008 | Plassmeyer | B60J 7/1851 296/223 |
| 2010/0038932 | A1 | | 2/2010 | Comfort | |
| 2010/0045075 | A1 | | 2/2010 | Mack | |
| 2013/0088052 | A1 | * | 4/2013 | Nellen | B60J 7/0015 296/216.08 |

FOREIGN PATENT DOCUMENTS

| DE | 10331269 | * | 1/2005 |
|---|---|---|---|
| DE | 10338722 | * | 3/2005 |
| DE | 102005013643 | * | 9/2006 |
| EP | 1291217 | * | 8/2002 |

* cited by examiner

Primary Examiner — Dennis H Pedder
(74) Attorney, Agent, or Firm — Garlick & Markison; Bruce E. Garlick

(57) ABSTRACT

A moveable panel system for a vehicle comprises: non-parallel tracks on a body of the vehicle, the body having an opening; a panel sized to cover the opening; a transverse guide member on the panel; and compensation drive mechanisms that couple the panel to the respective non-parallel tracks, each of the compensation drive mechanisms moveable along the transverse guide member and moveable in one of the non-parallel tracks.

20 Claims, 5 Drawing Sheets

MOVEABLE PANEL SYSTEM FOR NON-PARALLEL TRACKS

BACKGROUND

Vehicles have a variety of openings to allow passengers or cargo to enter and exit the vehicle, and/or to allow ventilation and light into a passenger cabin. Such openings are sometimes covered by a closure that can be controlled using a motor or by mechanical action by the passenger. For example, the panels that cover an opening in the roof of the vehicle are usually called sunroofs or moonroofs. The combination where a movable transparent panel in the roof is positioned adjacent a non-moveable transparent panel is sometimes referred to as a panoramic sunroof.

Traditionally, vehicle roof closures have been based on having parallel tracks in the roof. FIG. 1 shows a prior art sunroof system 100. The system has a sunroof panel 102 positioned next to another roof panel 104. The sunroof panel 102 is currently closed in that it is positioned atop an opening in the vehicle body. The sunroof panel can be opened by moving along parallel tracks 106 on each side of the panel 104.

The fact that the tracks are parallel puts design limitations on the vehicle body. For example, a distance 108 represents the spacing between the parallel tracks. This distance must necessarily be less than the narrowest width across the roof of the vehicle. Moreover, the opening that becomes accessible when the sunroof is opened (sometimes called the hands through opening) must be positioned between such tracks, and is therefore also constrained by the distance 108. In other words, with parallel tracks the design of the vehicle's roof has placed certain limitations on how large the sunroof opening can be made.

Some automobile manufacturers refer to the vehicle's dimensions using X-, Y- and Z-coordinates in a Cartesian coordinate system. For example, the X dimension is fore-aft in the vehicle, the Y dimension is left-right in the vehicle, and the Z dimension is up-down in the vehicle. Existing track mechanisms that are based on parallel tracks can then be characterized as allowing the panel track mechanism to travel at most in the X- and Z-dimensions, and not in the Y-dimension.

SUMMARY

In a first aspect, a moveable panel system for a vehicle comprises: non-parallel tracks on a body of the vehicle, the body having an opening; a panel sized to cover the opening; a transverse guide member on the panel; and compensation drive mechanisms that couple the panel to the respective non-parallel tracks, each of the compensation drive mechanisms moveable along the transverse guide member and moveable in one of the non-parallel tracks.

Implementations can include any or all of the following features. The opening is in a roof of the vehicle. The transverse guide member and the compensation drive mechanisms are positioned on an underside of the panel facing the vehicle. The transverse guide member is positioned at an edge of the panel. The edge is a rear edge of the panel on the vehicle. The moveable panel system further comprises longitudinal channels in the transverse guide member. Each of the compensation drive mechanisms is mounted onto the transverse guide member using the longitudinal channels. The moveable panel system further comprises cables, each positioned in a respective one of the longitudinal channels and attached to a corresponding one of the compensation drive mechanisms. The moveable panel system further comprises ng a link gear in the transverse guide member, the link gear configured to link movements of the cables to each other. A separation between the non-parallel tracks decreases in a direction of opening of the panel. The transverse guide member and the compensation drive mechanisms are re positioned at a rear edge of the panel, the moveable panel system further comprising front track mechanisms that couple a front edge of the panel to the body of the vehicle. The moveable panel system further comprises parallel tracks on the body, wherein the front track mechanisms couple the panel to the respective parallel tracks. The opening is between the parallel tracks. Each of the compensation drive mechanisms comprises a compensation drive slidably mounted onto the transverse guide member, and a track mechanism connected to the compensation drive. The track mechanism is hinged to the compensation drive. The panel has essentially an isosceles trapezoid shape.

In a second aspect, a moveable panel system for a vehicle comprises: non-parallel tracks on a body of the vehicle, the body having an opening; a panel sized to cover the opening; first means for slidably coupling the panel to the non-parallel tracks; and second means for compensating for the non-parallel tracks in moving the panel.

Implementations can include any or all of the following features. The second means compensates for the non-parallel tracks by slidably coupling the first means to the panel. The first means comprises compensation drives moveable along the second means. The second means comprises a transverse guide member, wherein the first means are moveable along the transverse guide member.

DETAILED DESCRIPTION

This document describes examples of systems and techniques for reducing the dependencies between the size of the sunroof opening and the width of the vehicle's roof. A moveable panel can be coupled to non-parallel tracks for its movement between a closed position and any of a variety of open positions. In some implementations, the tracks converge toward the rear of the vehicle's roof. For example, the tracks can essentially conform to a boat-tail narrowing of the vehicle's body toward the rear. A compensation mechanism can be provided to allow the panel to travel along the non-parallel tracks. For example, this can provide that the panel remains centered across the tracks as it travels along them.

Figure 1:
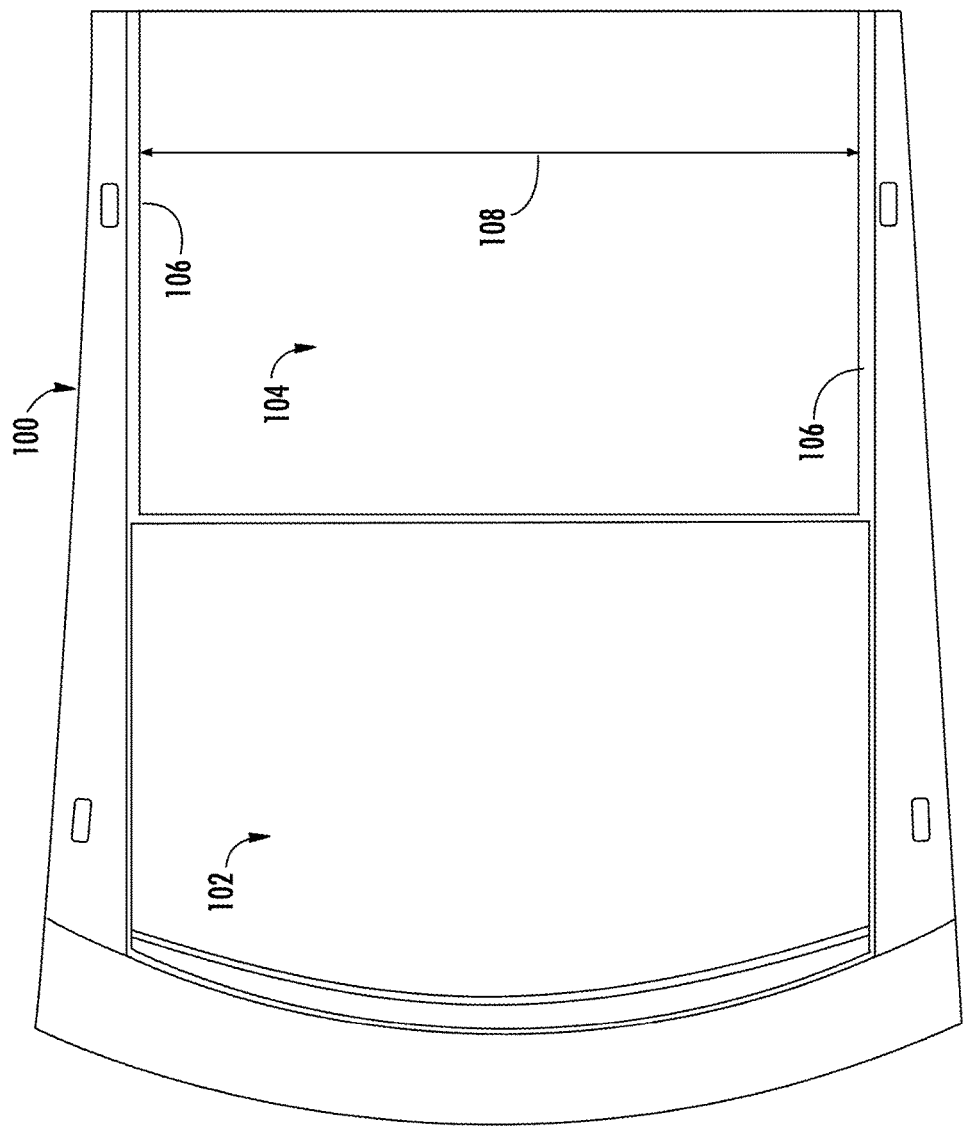
FIG. 1 shows a prior art sunroof system.
Figure 2:
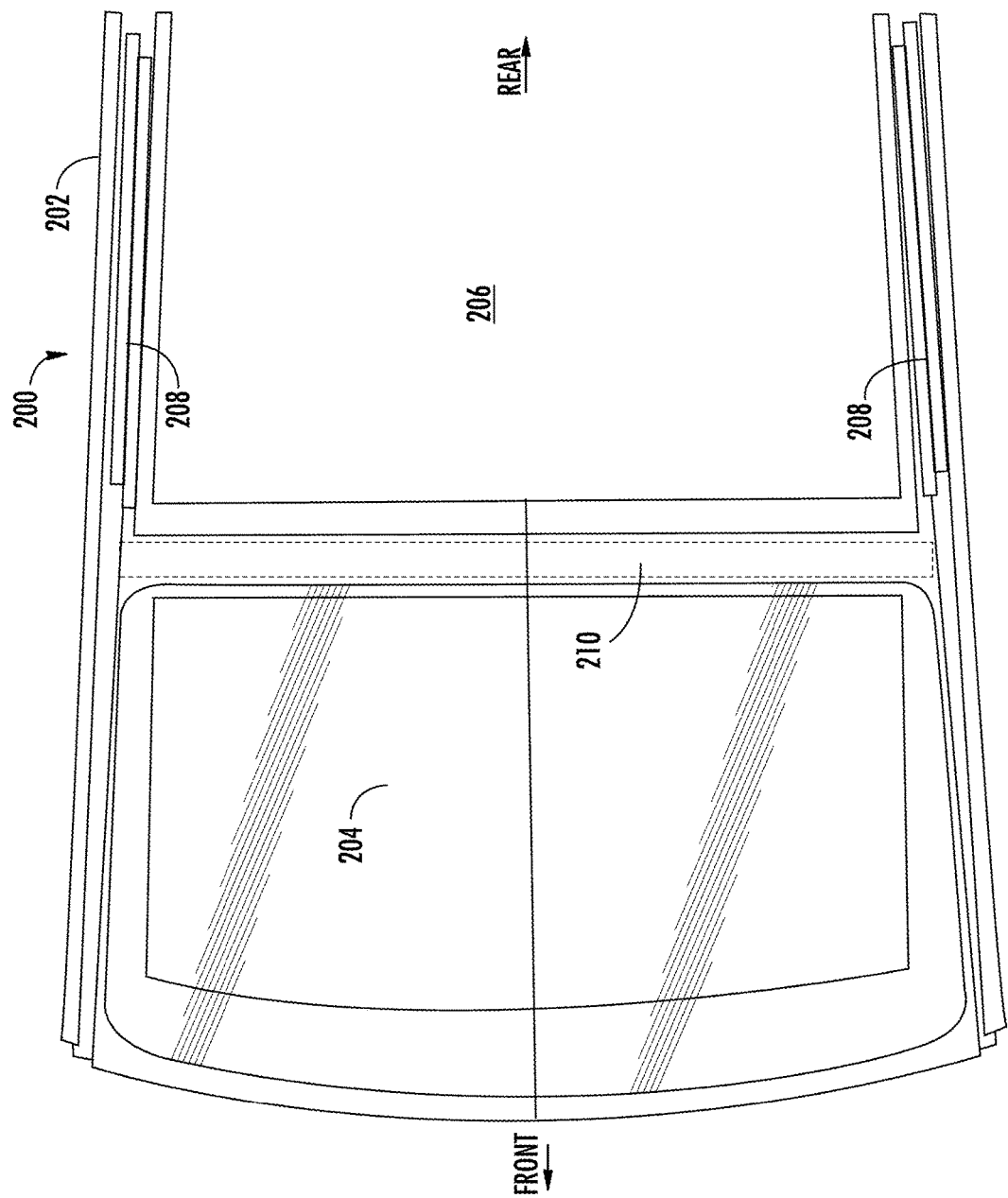
FIG. 2 shows a top view of an example of a moveable panel system.

FIG. 2 shows a top view of an example of a moveable panel system 200. The system is installed on a body 202 of a vehicle, more particularly in the roof of the vehicle so as to provide ability to open at least a portion of the roof and thereby create an opening into the passenger compartment.

The directions toward the front and rear of the vehicle are here indicated for illustration. Most of the vehicle body is here omitted for simplicity, but systems and techniques described herein can be used with any type of vehicle that has an opening covered by a moveable panel. This includes passenger vehicles, to name just one example.

The system includes a panel 204 that is installed so as to be movable between a closed position and any of various open positions. The panel can be transparent, semi-transparent or non-transparent. The panel is currently in the closed position and therefore covers an opening in the vehicle's roof. When the panel is partially or fully opened, it will travel onto an area 206 of the vehicle's roof. The area 206 is here shown empty for illustrative purposes, but is normally covered by one or more materials. Such material can be the same as the rest of the vehicle's body, or it can be a transparent panel installed in the roof so as to form a panoramic sunroof, to name just two examples.

Here, non-parallel tracks 208 are installed on the vehicle. The tracks are positioned on each side of the area 206. The tracks can be non-parallel in any of various ways. In some implementations, a separation between the non-parallel tracks decreases in a direction of opening of the panel. The current example shows the non-parallel tracks converging toward the rear of the vehicle. A compensation mechanism allows the panel 204 to travel in both directions on the non-parallel tracks 208 so as to open or close the sunroof. In other implementations, tracks can be non-parallel in a different way, such as to diverge.

A transverse guide member 210 is here mounted onto an underside of the panel 204 and is therefore shown in phantom. As such, the transverse guide member faces the vehicle, and can be positioned at either the front or rear edge of the panel. In some implementations, respective transverse guide members are positioned both at the front and rear edges of the panel.

Compensation mechanisms described herein facilitate that moveable panels can travel along non-parallel tracks. This can allow the moveable panel (i.e., the sunroof panel) to have a non-rectangular shape. For example, the panel 204 here has a somewhat rounded shape toward the front of the vehicle, but essentially has the shape of an isosceles trapezoid in that the front and rear edges are (essentially) parallel, and the side edges are oriented at equal and opposing angles relative to the front and rear edges. Moreover, the hands-through opening in the roof can be of rectangular shape, or it can have another shape, including, but not limited to, a trapezoid shape.

Figure 3:
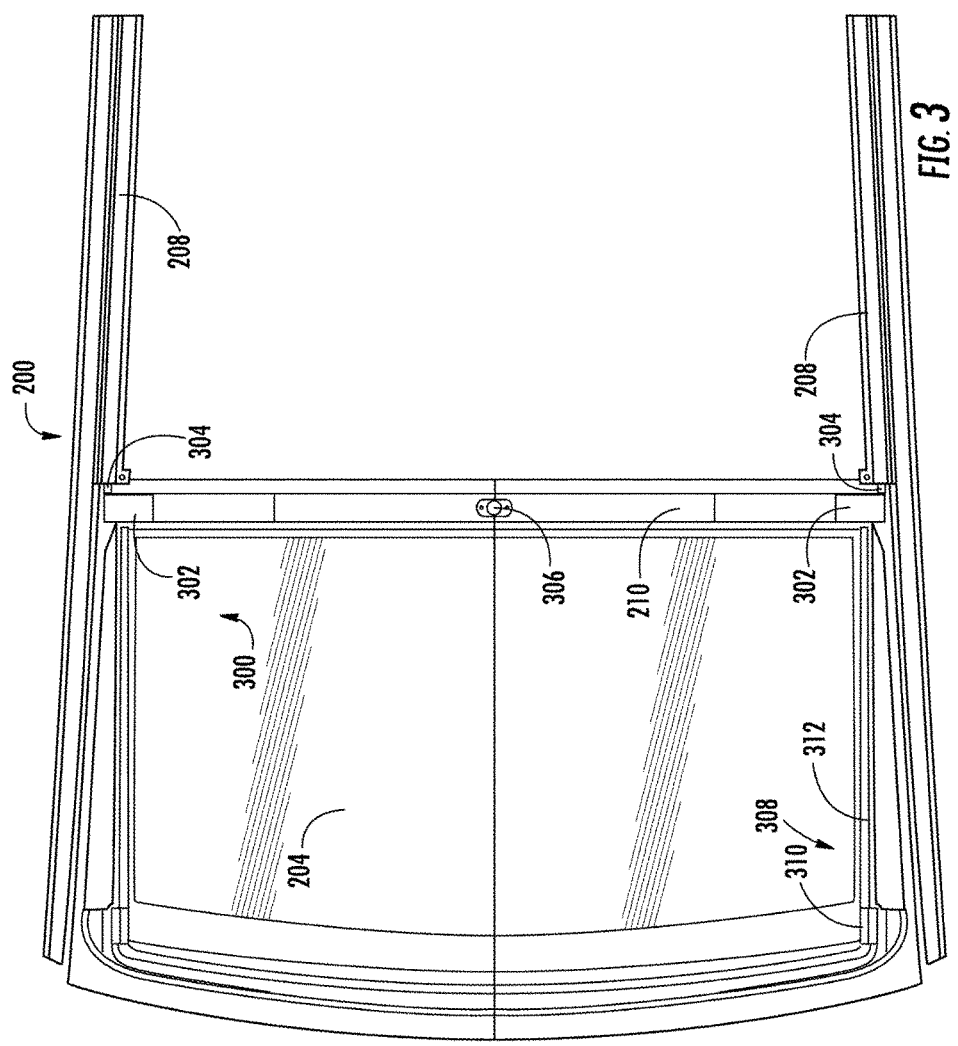
FIG. 3 shows a bottom view of the moveable panel system of FIG. 2.

FIG. 3 shows a bottom view of the moveable panel system 200 of FIG. 2. The roof, including the moveable panel 204 and the non-parallel tracks 208, is here shown from the opposite direction than in the previous figure. The transverse guide member 210 is fully visible in this view as it is positioned on the underside of the panel toward the rear end thereof. The transverse guide member 210 is part of a compensation mechanism 300 that also includes respective compensation drives 302 for each of the non-parallel tracks 208. The compensation mechanism is here provided to allow the panel to travel along the non-parallel tracks. Each of the compensation drives is therefore able to move (e.g., by sliding) at least part of the way along the length of the transverse guide member. The compensation mechanism 300 also includes respective track mechanisms 304, each of which is connected to one of the compensation drives 302 so as to couple it to the corresponding non-parallel track 208. For example, this can facilitate that the mechanism (in this example the rear one) that couples the panel to the non-parallel tracks is able to move not only in the X- and Z-directions, but also in the Y-direction. In this view, the track mechanisms 304 are partially obscured by the non-parallel tracks 208.

That is, the compensation drives 302 can be slidably mounted onto the transverse guide member 210 so as to compensate for the non-parallel orientation of the tracks 208. In some implementations, the compensation drives 302 can move independently of each other. In the present example, however, their movements are controlled with regard to each other by way of a link gear 306 that can be mounted inside the transverse guide member 210. For example, each of the compensation drives 302 can have a respective cable (to be described below) attached to it. These cables can engage the link gear (e.g., on diametrically opposite sides thereof) so that if one of the cables is moved, the other cable is also moved the same distance in the opposite direction. For example, this can reduce or eliminate binding between each of the respective compensation drive 302 and the transverse guide member 210. That is, the cables and the link gear can facilitate that the compensation drives 302 are always symmetrically positioned with regard to the center point of the transverse guide member.

The above example illustrates that the moveable panel system 200 can include the non-parallel tracks 208 that are positioned on the body of the vehicle, and the vehicle body has an opening that is presently covered by the moveable panel 204. The transverse guide member 210 is positioned on the panel 204, and the compensation drive mechanisms 302 are configured to each couple the panel to one of the respective non-parallel tracks. Each of the compensation drive mechanisms is moveable along the transverse guide member and is moveable in one of the non-parallel tracks. As such, each of the track mechanisms 304 can serve to slidably couple the panel to the non-parallel tracks. As another example, the compensation drives 302 and the transverse guide member 210 can compensate for the non-parallel tracks when the panel is moved. Such compensation can be done by slidably coupling the compensation drives to the panel.

The system here includes front track mechanisms 308 on each side of the moveable panel. Each of the front track mechanisms includes a track mechanism 310 and a front track 312. For example, each of the track mechanisms 310 is mounted on the underside of the moveable panel toward the front edge thereof, and is configured to be slidably coupled to a corresponding one of the front tracks 312, which can be attached to the vehicle body (e.g., to a roof structure). The hands-through opening that is made accessible by moving the panel 204 is here positioned between the parallel front tracks.

The front tracks are in this example parallel to each other and the front track mechanisms do not need to have any compensation mechanism as described herein. In other implementations, however, a compensation mechanism can instead be provided for the front track mechanisms, or both the front and rear track mechanisms can feature some form of compensation mechanism.

Figure 4:
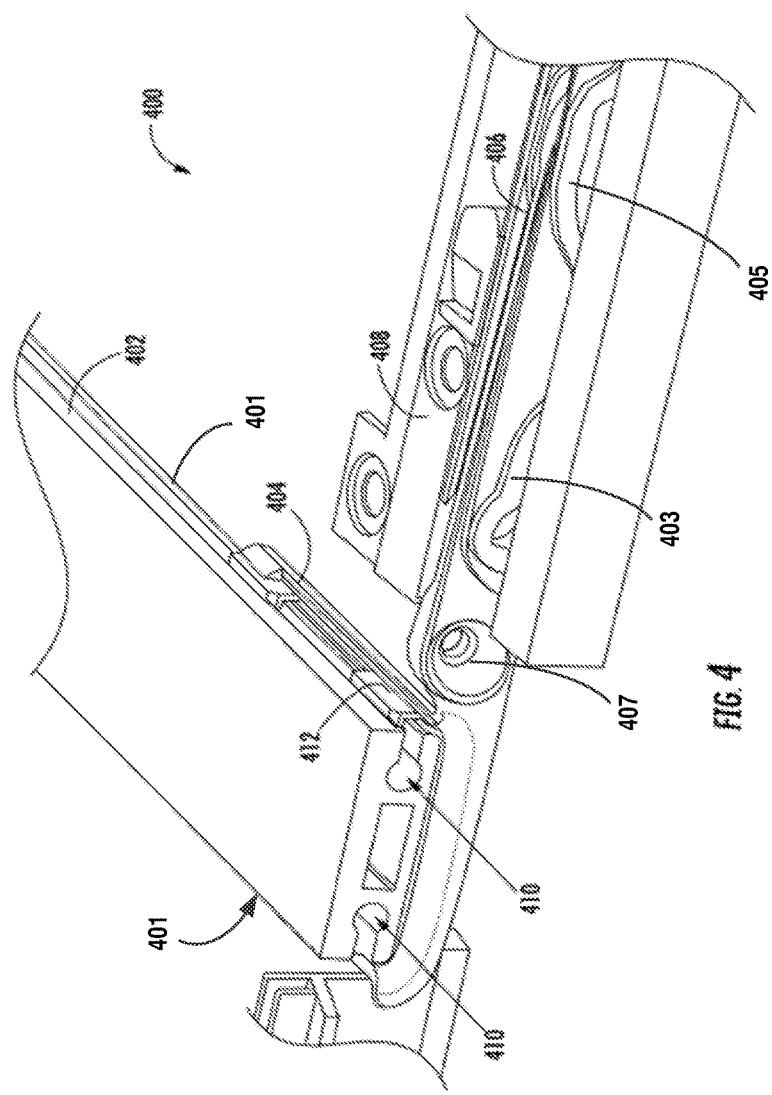
FIG. 4 shows an example of a compensation drive mechanism.

FIG. 4 shows an example of a compensation drive mechanism 400. The compensation drive mechanism is here shown with a transverse guide member 402. The compensation drive mechanism includes a compensation drive 404 coupled to the transverse guide member, and a track mechanism 406 connected to the compensation drive. The track mechanism 406 is in turn coupled to a track 408 that is non-parallel with regard to a corresponding track (not shown) at the other end of the transverse guide member 402.

That is, the track mechanism can be moved along the non-parallel track in either direction, for example by a drive cable actuated by a motor. The track mechanism can provide camming action with regard to the compensation drive and the transverse guide member via cam 403 and cam 405, and therefore provide movement of (at least part of) the moveable panel in the Z-direction. Here, this is in part accomplished by way of a hinged connection 407 between the track mechanism and the compensation drive. For example, the cam function can allow the panel to sit flush with the surrounding roof surface when closed, and can allow the panel to be raised above the roof surface to facilitate movement along the tracks. In other implementations, a cam can be provided in or near the non-parallel track so as to facilitate raising and lowering of the panel as it moves.

The compensation drive 404 is here slidably mounted onto outer edges 401 of the transverse guide member 402. In some implementations, the transverse guide member has longitudinal channels 410. For example, the transverse guide member is formed by extrusion and has a profile that includes the channels along its entire length. In some implementations, each of the compensation drives 404 is mounted onto the transverse guide member 402 using the longitudinal channels. For example, the compensation drive can have one or more shoes 412 attached thereto that engage with an opening formed by the longitudinal channel. As will be describe in more detail below, the compensation drives can have attached thereto respective cables, each of which cables is accommodated inside a corresponding one of the longitudinal channels. For example, the cable is attached to the shoe 412 such that the cable and the compensation drive move together longitudinally along the transverse guide member.

Figure 5:
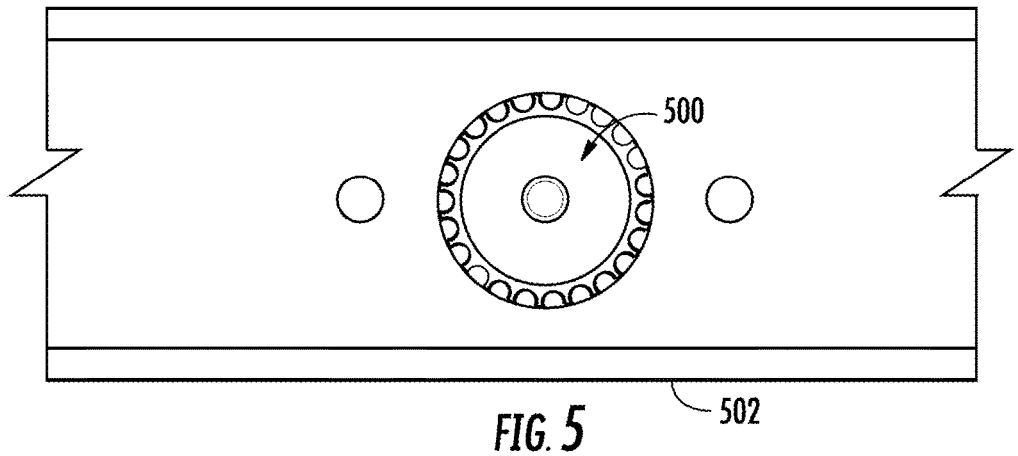
FIG. 5 shows an example of a link gear in a guide member.

FIG. 5 shows an example of a link gear 500 in a guide member 502. The guide member can be used with any or all examples of moveable panel systems described herein. Only a portion of the guide member is here shown, for simplicity. The link gear can be mounted at a center point of the guide member. The link gear is here rotatable in either direction about an axis that is perpendicular to the plane of this illustration. The link gear is positioned between internal longitudinal channels (see, e.g., the longitudinal channels 410 in FIG. 4) that traverse some or all of the length of the guide member. Moreover, the outer edge of the link gear extends into each of the longitudinal channels and engages with the cable positioned there.

Figure 6:
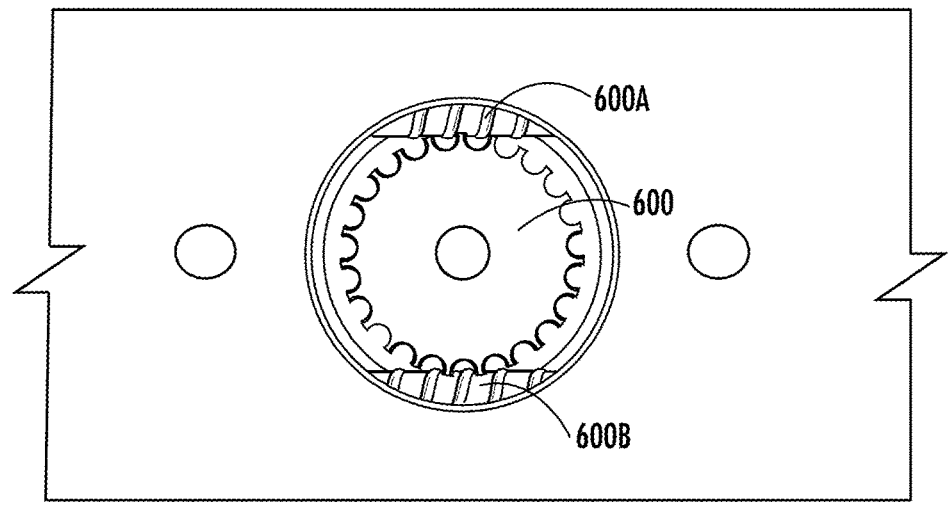
FIG. 6 shows an example of cables engaging with a link gear.

FIG. 6 shows an example of cables 600A-B engaging with a link gear 600. Here, each cable has outer threads that mesh with teeth of the link gear. In some implementations, drive cables for traditional sunroofs can be used. Here, the cables engage opposite edges of the link gear. As a result, movement of one of the cables (i.e., due to the Y-direction movement by the compensation drive effectuated by the non-parallel track), causes the other cable to be moved by an equal amount in the opposite direction along the guide member. As such, a compensation drive mechanism can provide that coupling mechanism for a movable panel are adjusted in equal and opposite ways as the panel travels along a non-parallel track.

A number of implementations have been described as examples. Nevertheless, other implementations are covered by the following claims.

What is claimed is:

1. A moveable panel system for a vehicle, the moveable panel system comprising:

non-parallel tracks on a body of the vehicle, the body having an opening;
a panel sized to cover the opening;
a transverse guide member attached to the panel and having a length;
compensation drives slidably mounted onto outer edges of the transverse guide member; and
track mechanisms;
wherein a respective track mechanism of the track mechanisms is connected to a respective compensation drive of the compensation drives and couples the respective compensation drive to a respective track of the non-parallel tracks; and
wherein the compensation drives slide at least part of the way along the length of the transverse guide member.

2. The moveable panel system of claim 1, wherein the non-parallel tracks converge towards a rear of the vehicle.

3. The moveable panel system of claim 1, wherein the compensation drives move independently.

4. The moveable panel system of claim 1, wherein movement of the compensation drives is controlled with regard to each other.

5. The moveable panel system of claim 4, further including a link gear, and wherein movement of the compensation drives is controlled with regard to each other by way of the link gear.

6. The moveable panel system of claim 1, wherein the transverse guide member is attached to an underside of the panel.

7. The moveable panel system of claim 6, wherein the transverse guide member is attached at a rear edge of the panel.

8. The moveable panel system of claim 1, wherein the track mechanisms are attached to a drive cable.

9. The moveable panel system of claim 1, wherein the track mechanisms are hingedly connected to the compensation drives.

10. The moveable panel system of claim 1, wherein the non-parallel tracks include a cam.

11. The moveable panel system of claim 1, wherein the transverse guide member defines longitudinal channels in the outer edges of the transverse guide member.

12. The moveable panel system of claim 11, wherein the compensation drives are mounted to the transverse guide member using the longitudinal channels.

13. The moveable panel system of claim 12, wherein the compensation drives are mounted to the transverse guide member using the longitudinal channels via one or more shoes attached to the compensation drives.

14. The moveable panel system of claim 11, wherein the respective compensation drive is attached to a respective cable of a plurality of cables, wherein the respective cable of the plurality of cables is accommodated inside a respective longitudinal channel of the longitudinal channels.

15. The moveable panel system of claim 14, wherein the transverse guide member further includes a link gear.

16. The moveable panel system of claim 15, wherein the link gear extends into the longitudinal channels and engages with the plurality of cables.

17. The moveable panel system of claim 1, wherein the non-parallel tracks converge towards a rear of the vehicle and wherein the compensation drives move towards each other as the track mechanisms move towards the rear of the vehicle.

18. A moveable panel system for a vehicle, the moveable panel system comprising:
non-parallel tracks on a body of the vehicle, the body having an opening;
a panel sized to cover the opening;
a transverse guide member attached to the panel and having a length and further including a link gear;
compensation drives slidably mounted onto outer edges of the transverse guide member; and
track mechanisms;
wherein a respective track mechanism of the track mechanisms is connected to a respective compensation drive of the compensation drives and couples the respective compensation drive to a respective track of the non-parallel tracks;
wherein the transverse guide member defines longitudinal channels in the outer edges of the transverse guide member;
wherein the respective compensation drive is attached to a respective cable of a plurality of cables;
wherein the respective cable of the plurality of cables is accommodated inside a respective longitudinal channel of the longitudinal channels;
wherein the link gear extends into the longitudinal channels and engages with the plurality of cables; and
wherein the compensation drives slide at least part of the way along the length of the transverse guide member.

19. The moveable panel system of claim 18, wherein the non-parallel tracks converge towards a rear of the vehicle.

20. The moveable panel system of claim 19, wherein the compensation drives move towards each other as the track mechanisms move towards the rear of the vehicle.

* * * * *